United States Patent
Gomi

(10) Patent No.: US 9,189,651 B2
(45) Date of Patent: Nov. 17, 2015

(54) USER INFORMATION MANAGEMENT APPARATUS AND USER INFORMATION MANAGEMENT METHOD

(71) Applicant: YAHOO JAPAN CORPORATION, Tokyo (JP)

(72) Inventor: Hidehito Gomi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 0 days.

(21) Appl. No.: 14/022,497

(22) Filed: Sep. 10, 2013

(65) Prior Publication Data

US 2014/0082748 A1    Mar. 20, 2014

(30) Foreign Application Priority Data

Sep. 14, 2012    (JP) .................................. 2012-202527

(51) Int. Cl.
*G06F 7/04* (2006.01)
*G06F 21/62* (2013.01)
*G06F 21/33* (2013.01)

(52) U.S. Cl.
CPC ............ *G06F 21/6245* (2013.01); *G06F 21/33* (2013.01)

(58) Field of Classification Search
CPC ..... G06F 21/33; G06F 21/6245; G06F 21/44; G06Q 20/4014; G06Q 20/40; G06Q 30/02; G06Q 30/0254; H04L 63/0815; H04L 63/107; H04L 63/1425; H04L 63/168; H04L 67/02; H04M 15/58

USPC ............................................. 726/28; 713/182
See application file for complete search history.

(56) References Cited

U.S. PATENT DOCUMENTS 6,671,358 B1 * 12/2003 Seidman et al. ............ 379/93.12
2008/0028227 A1 * 1/2008 Sakurai ........................ 713/182

FOREIGN PATENT DOCUMENTS

| JP | A-2002-96715 | 4/2002 |
|---|---|---|
| JP | A-2002-207912 | 7/2002 |
| JP | A-2005-339171 | 12/2005 |
| JP | 2006-106965 A | 4/2006 |
| JP | A-2009-205305 | 9/2009 |
| JP | A-2011-118592 | 6/2011 |

OTHER PUBLICATIONS

Office Action issued in Japanese Application 2012-202527 mailed Feb. 12, 2014 (with translation).
Nov. 25, 2014 Office Action issued in Japanese Application No. 2012-202527.

* cited by examiner

*Primary Examiner* — Dant Shaifer Harriman
*Assistant Examiner* — Abiy Getachew
(74) *Attorney, Agent, or Firm* — Oliff PLC

(57) ABSTRACT

A user information management apparatus stores various types of user information on a user in a storage unit, causes a providing unit to provide a user with an access code used to access the user information on the user stored in the storage unit, and when receiving the access code from the facility device installed in a facility that provides a service, causes the transmitting unit to transmit the user information corresponding to the service provided by the facility having the facility device among the various types of the user information stored in the storage unit.

10 Claims, 10 Drawing Sheets

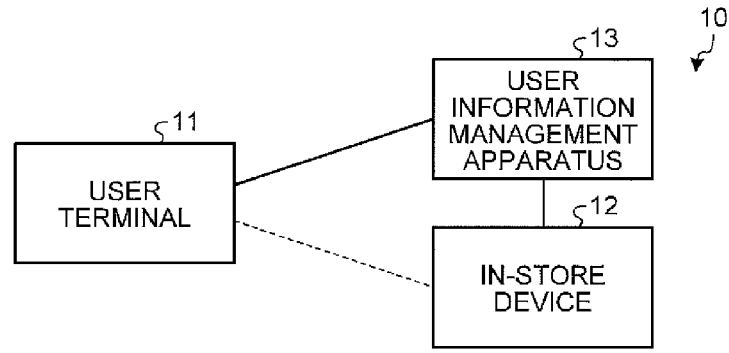
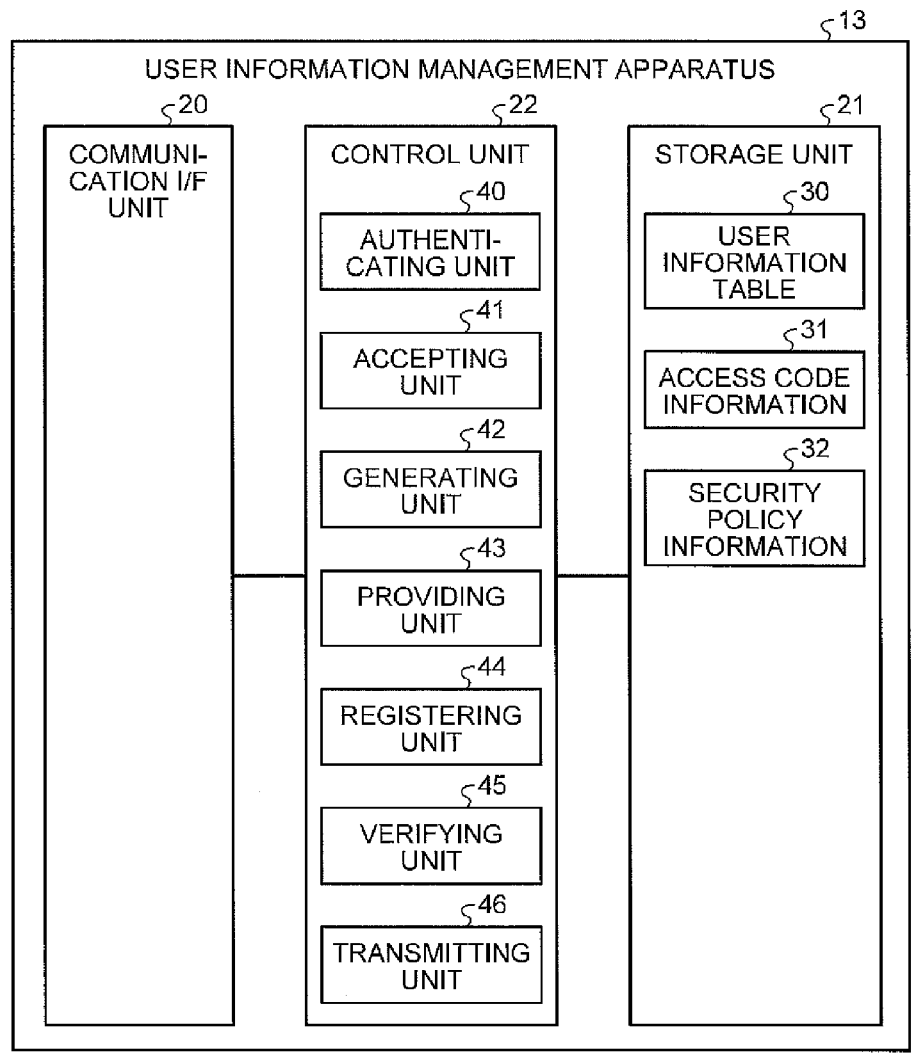

FIG.3

| USER ID | PASSWORD | NAME | ADDRESS | DATE OF BIRTH | AGE | CREDIT CARD NUMBER |
|---|---|---|---|---|---|---|
| 0001 | XXXX | A | XXXX | 19XX/XX/XX | XX | XXXXXXXX |
| 0002 | XXXX | B | XXXX | 20XX/XX/XX | XX | XXXXXXXX |
| ... | | | | | | |

| ACCESS CODE | USER ID | DATE AND TIME | USER INFORMATION TO BE PROVIDED |
|---|---|---|---|
| XXXXXA | 0001 | 2012/XX/XX 12:00:00 | AGE |
| XXXXXB | 0002 | 2012/XX/XX 12:05:05 | CREDIT CARD NUMBER |
| ⋮ | | | |

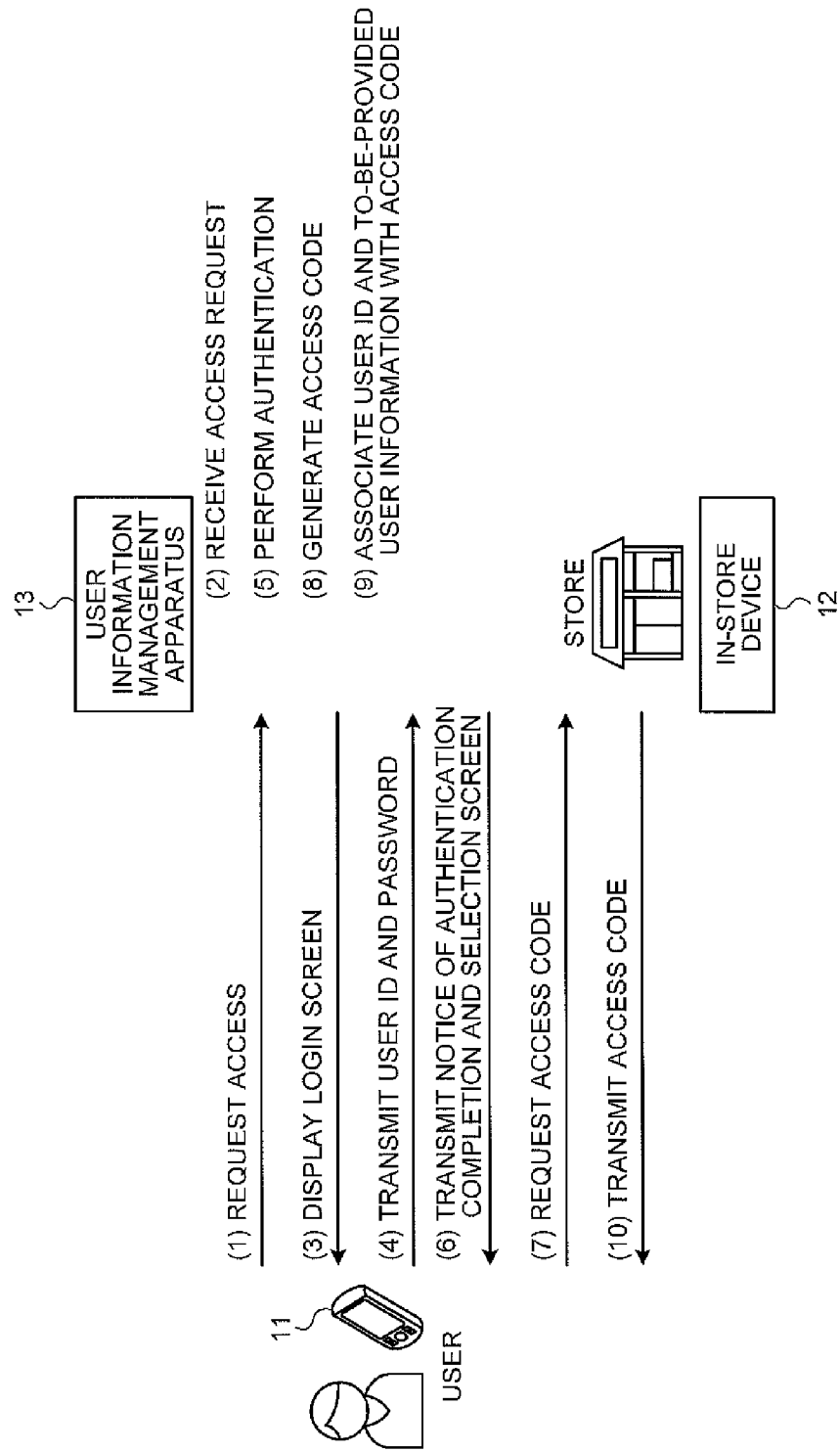

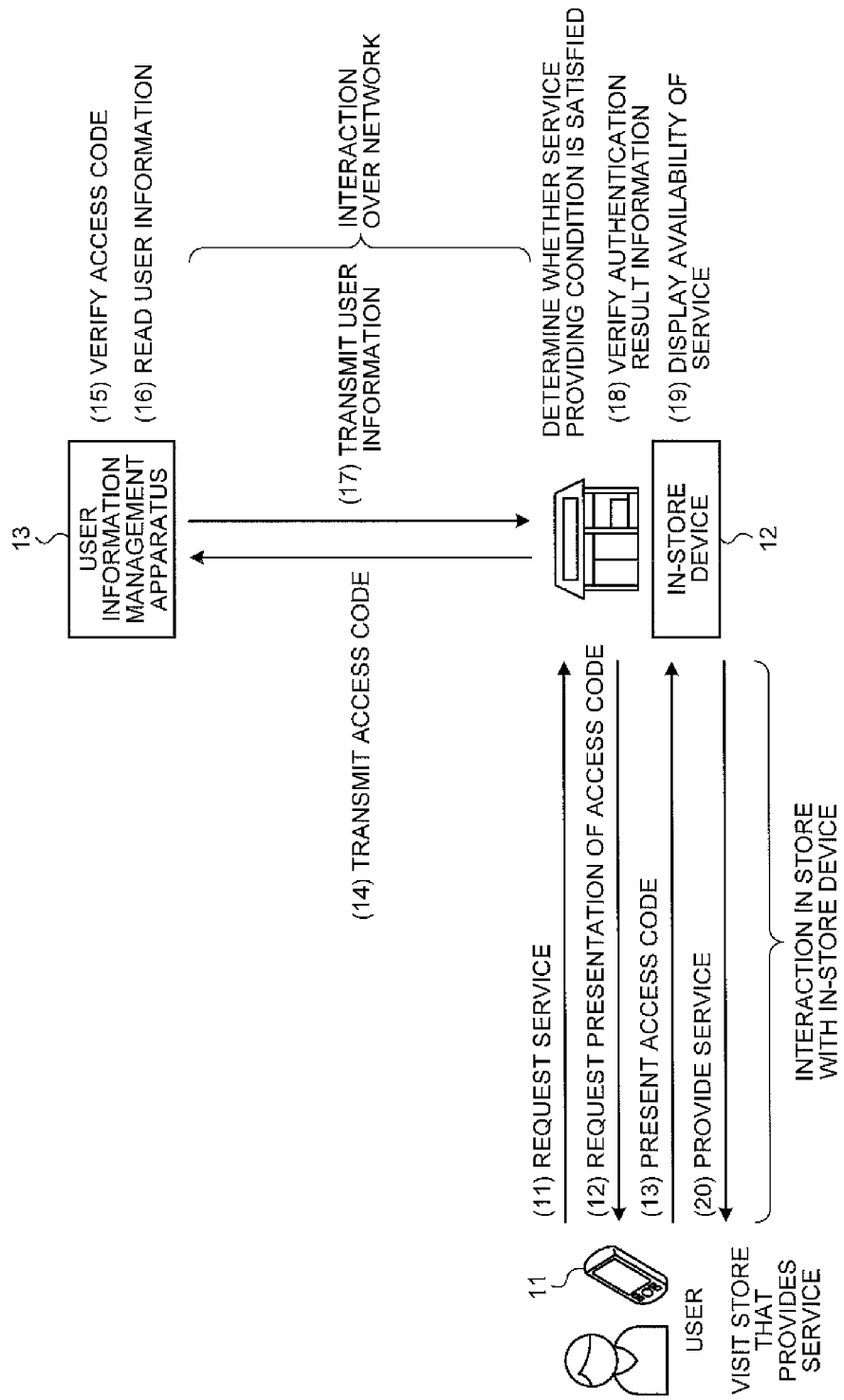

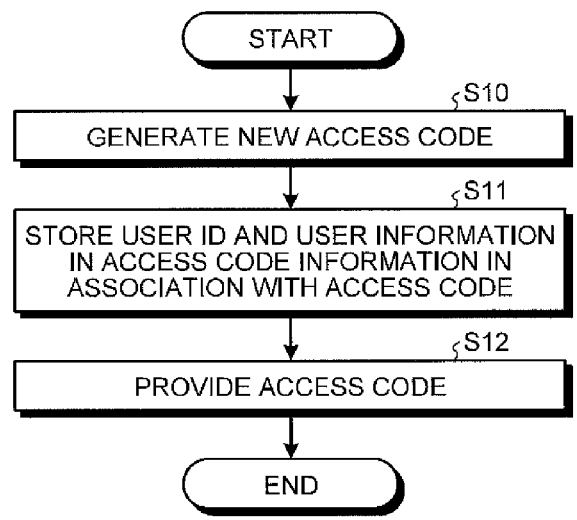
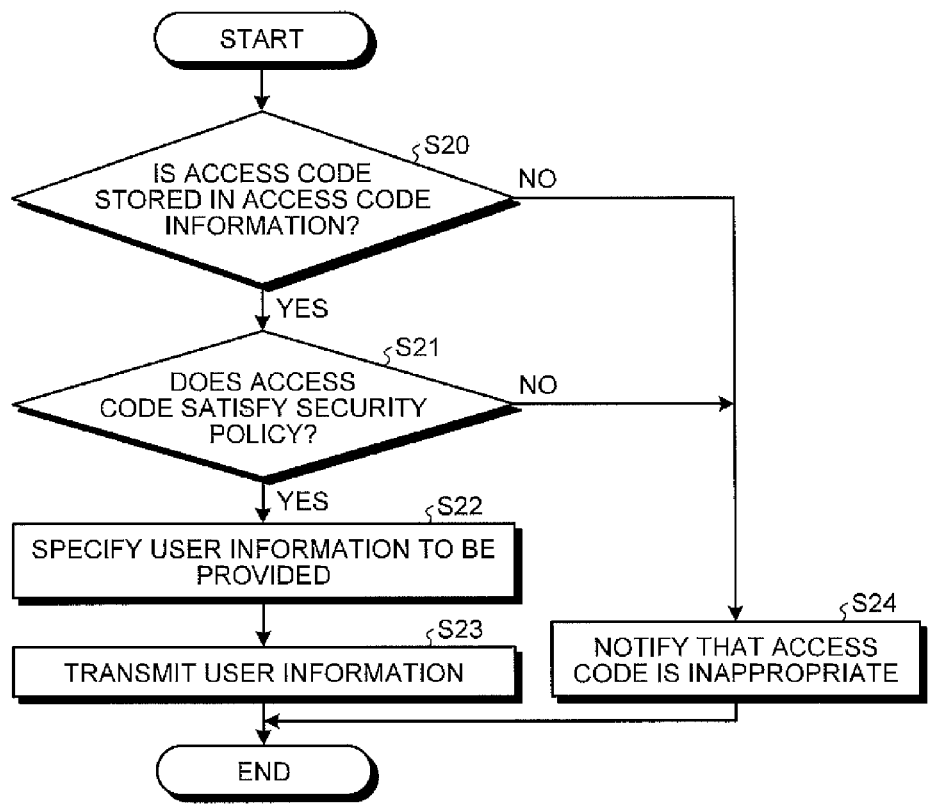

| SERVICE | NECESSARY USER INFORMATION |
|---|---|
| PURCHASE OF TOBACCO | AGE |
| PURCHASE OF ALCOHOL | AGE |
| PAYMENT BY CREDIT CARD | CREDIT CARD NUMBER |
| ⋮ | |

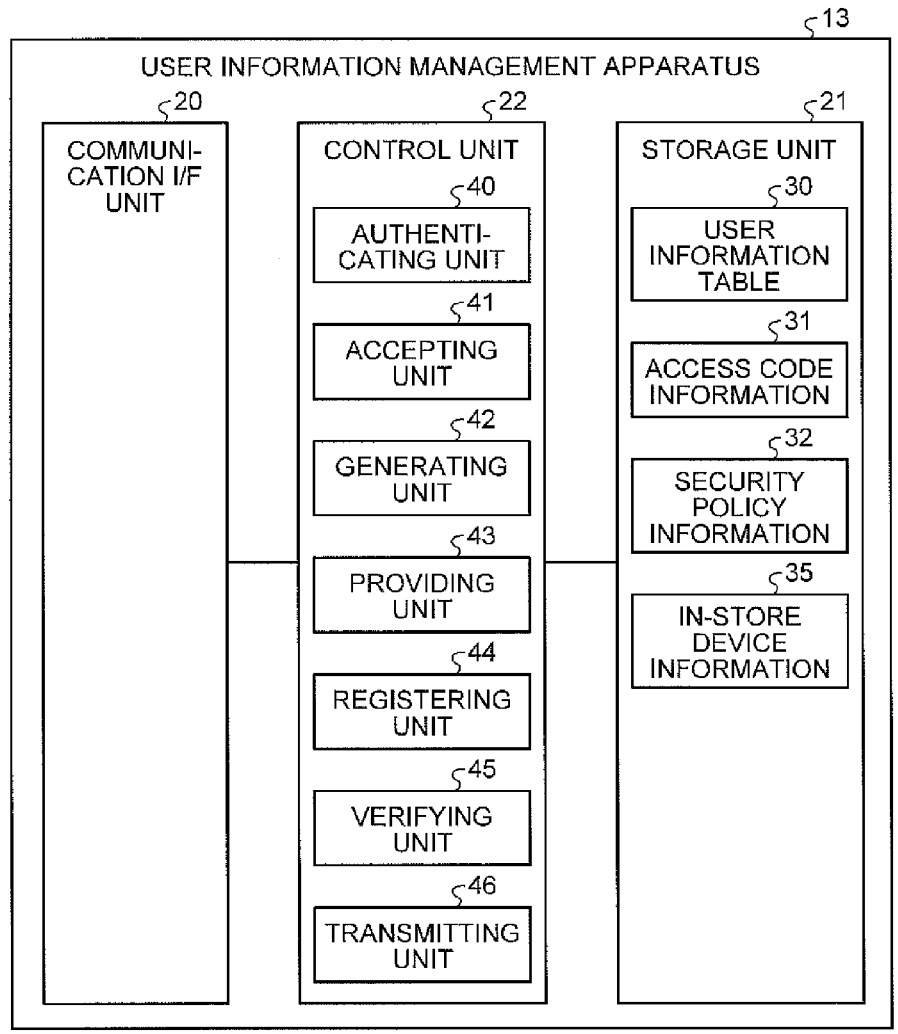

USER INFORMATION MANAGEMENT APPARATUS AND USER INFORMATION MANAGEMENT METHOD

CROSS-REFERENCE TO RELATED APPLICATIONS

The present application claims priority to and incorporates by reference the entire contents of Japanese Patent Application No. 2012-202527 filed in Japan on Sep. 14, 2012.

BACKGROUND OF THE INVENTION

1. Field of the Invention

The present invention relates to a user information management apparatus and a user information management method.

2. Description of the Related Art

In stores that provide services, in some cases, it is verified whether a user who uses the provided services is eligible to receive the services. For example, a store that sells alcohol or tobacco verifies whether a user is 20 years of age or older by checking a user's identification card, such as a driver's license, when selling the alcohol or tobacco.

As a related technology, a technology has been proposed in which certification information stored in a mobile terminal is transmitted from an in-vehicle device to a server, and if a certificate authority confirms the owner of a vehicle associated with the certification information, the lock on the vehicle is released (for example, Japanese Laid-open Patent Publication No. 2002-96715).

However, when the user presents the identification card, unnecessary information may be leaked. For example, when the user presents the driver's license to a store staff to confirm the age, the store staff may also see the address written on the driver's license.

SUMMARY OF THE INVENTION

It is an object of the present invention to at least partially solve the problems in the conventional technology.

According to one aspect of an embodiment of the present invention, a user information management apparatus includes: a storage unit that stores therein various types of user information on a user; a providing unit that provides a user with an access code used to access the user information stored in the storage unit; and a transmitting unit that transmits, when receiving the access code from a facility device installed in a facility that provides a service, user information corresponding to the service provided by the facility having the facility device among the various types of user information stored in the storage unit.

According to another aspect of an embodiment of the present invention, a user information management method executed by a computer, the method includes: providing a user with an access code used to access a user information stored in a storage unit that stores therein various types of user information on a user; and transmitting, when receiving the access code from a facility device installed in a facility that provides a service, user information corresponding to the service provided by the facility having the facility device among the various types of user information stored in the storage unit.

According to another aspect of an embodiment of the present invention, computer-readable recording medium having stored therein a user information management program for causing a computer to execute a process, the process includes: providing a user with an access code used to access a user information stored in a storage unit that stores therein various types of user information on a user; and transmitting, when receiving the access code from a facility device installed in a facility that provides a service, user information corresponding to the service provided by the facility having the facility device among the various types of user information stored in the storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic diagram illustrating a configuration of a system according to a first embodiment;

FIG. 2 is a diagram illustrating a functional configuration example of a user information management apparatus according to the first embodiment;

FIG. 3 is a diagram illustrating an example of a data structure of a user information table according to the first embodiment;

FIG. 7 is a sequence diagram illustrating the flow for providing an access code to a user;

FIG. 8 is a sequence diagram illustrating the flow for providing user information on a user to the in-store device by using the access code;

FIG. 9 is a flowchart illustrating the flow of an access code providing process;

FIG. 10 is a flowchart illustrating the flow of a user information providing process;

FIG. 14 is a diagram illustrating a functional configuration example of a user information management apparatus according to a third embodiment; and FIG. 15 is a diagram illustrating an example of a data structure of in-store device information.

DETAILED DESCRIPTION OF THE PREFERRED EMBODIMENTS

Figures 4, 5:
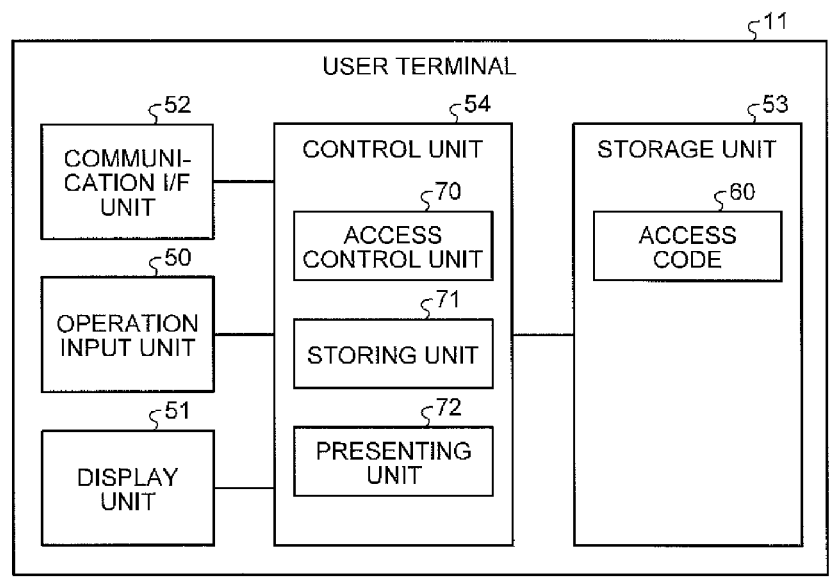
FIG. 4 is a diagram illustrating an example of a data structure of access code information according to the first embodiment.
FIG. 5 is a diagram illustrating a functional configuration example of a user terminal according to the first embodiment.

Exemplary embodiments (hereinafter, referred to as "embodiments") of a user information management apparatus, a user information management method, and a user information management program according to the present invention will be explained in detail below with reference to the accompanying drawings. The present invention is not limited to the embodiments below. The embodiments may be combined appropriately as long as the processing contents do not conflict with each other. In the following, an example will be explained that a store serves as a service providing facility, an in-store device serves as a facility device, and user information corresponding to a service provided by the store is transmitted to the in-store device.

First Embodiment 1-1. System Configuration

A first embodiment will be explained below. In the first embodiment, a system will be explained, in which a user registers various types of user information, such as personal information, on the user in a user information management apparatus, and when the user uses a service provided by a store, the store verifies whether the user is eligible to receive the service based on the user information provided by the user information management apparatus. FIG. 1 is a schematic diagram illustrating a configuration of the system according to the first embodiment. As illustrated in FIG. 1, a system 10 includes a user terminal 11, an in-store device 12, and a user information management apparatus 13. The user terminal 11 and the user information management apparatus 13 are connected so as to communicate with each other via a network (not illustrated), and the in-store device 12 and the user information management apparatus 13 are connected so as to communicate with each other via the network (not illustrated). The network may be any communication network, such as the Internet, a local area network (LAN), a virtual private network (VPN), or a mobile communication network, regardless of whether it is wired or wireless. In the example in FIG. 1, the connection between the user terminal 11 and the user information management apparatus 13 and the connection between the in-store device 12 and the user information management apparatus 13 are denoted by solid lines indicating online states, while the connection between the user terminal 11 and the in-store device 12 is denoted by a dashed line indicating an offline state. Incidentally, while FIG. 1 illustrates an example in which the system 10 includes one user terminal 11 and one in-store device 12, the disclosed system is not limited to this example and may include an arbitrary number of the user terminals 11 and the in-store devices 12. Furthermore, the system 10 may include a plurality of the user information management apparatuses 13.

The user terminal 11 is a terminal device of a user. For example, the user terminal 11 may be a desktop personal computer (PC), a tablet PC, a notebook PC, a mobile phone, a smartphone, or a personal digital assistant (PDA).

The in-store device 12 is a device installed in a store that provides a service, and may be, for example, a point-of-sale (POS) terminal that performs transaction processing in the store. The in-store device 12 may be an information processing apparatus, such as a desktop PC, a tablet PC, or a notebook PC. In the store, in some cases, it is verified whether a user who uses a provided service is eligible to receive the service. For example, when the store sells alcohol or tobacco, the store verifies whether a user who buys alcohol or tobacco is 20 years of age or older. The in-store device 12 acquires user information needed for a service provided by the store and assists a store staff to confirm the user. For example, the in-store device 12 acquires personal information, such as the age, of the user and displays the acquired personal information on a predetermined display unit (display).

The user information management apparatus 13 is an information processing apparatus, such as a server computer, that manages various types of information on the user. For example, the user information management apparatus 13 stores therein various types of user information on the user. The user information includes various types of personal information on the user, such as the name, the address, the date of birth, the age, and the credit card number. A user may register the user information in the user information management apparatus 13 via the user terminal 11. Alternatively, an administrator or the like of the user information management apparatus 13 may register the user information in the user information management apparatus 13 after confirming that the information declared by the user is valid. The user information may include various types of information on the user, such as a user authentication result, in addition to the personal information.

The user information management apparatus 13 provides the user with an access code to access the various types of user information on the user stored as above. When receiving the access code from the in-store device 12 installed in the store, the user information management apparatus 13 transmits user information corresponding to a service provided by the store from among the various types of user information stored as above to the in-store device 12.

1-2. Configurations of User Information Management Apparatus, User Terminal, and in-Store Device The user terminal 11, the in-store device 12, and the user information management apparatus 13 according to the first embodiment will be explained in detail below. First, a configuration of the user information management apparatus 13 will be explained. FIG. 2 is a diagram illustrating a functional configuration example of the user information management apparatus according to the first embodiment.

As illustrated in FIG. 2, the user information management apparatus 13 includes a communication interface (I/F) unit 20, a storage unit 21, and a control unit 22.

The communication I/F unit 20 is an interface, such as a network interface card (NIC). The communication I/F unit 20 transmits and receives various types of data to and from other devices via a network (not illustrated). For example, the communication I/F unit 20 transmits data of various screens, such as a login screen and a user information selection screen, to the user terminal 11, and receives various types of operating information on the screens from the user terminal 11. The communication I/F unit 20 also transmits an access code to access the user information to the user terminal 11. The communication I/F unit 20 receives the access code from the in-store device 12 and transmits, to the in-store device 12, user information corresponding to a service provided by a store where the in-store device 12 is installed.

The storage unit 21 is a device for storing various types of information. For example, the storage unit 21 may be a semiconductor memory device, such as a random access memory (RAM) or a flash memory, or a storage device, such as a hard disk or an optical disk.

The storage unit 21 stores therein an operating system (OS) executed by the control unit 22 and various programs used to manage the user information. The storage unit 21 also stores therein various types of information. For example, the storage unit 21 stores therein a user information table 30, access code information 31, and security policy information 32.

The user information table 30 is a table for storing various types of user information on a user who uses the system 10. For example, the user information table 30 stores therein a user ID and a password of the user. The user information table 30 also stores therein various types of personal information on the user. For example, the user information table 30 stores therein the name, the address, the date of birth, the age, and a credit card number of the user as the various types of personal information. FIG. 3 is a diagram illustrating an example of a data structure of the user information table according to the first embodiment. In the user information table 30 illustrated in FIG. 3, fields for storing the user ID, the password, the name, the address, the date of birth, the age, and the credit card number are provided, and information is stored in each of the fields for each user. The various types of information stored in the user information table 30 may separately be stored in a plurality of tables by associating the information with, for example, the user ID.

The access code information 31 is data in which information on the access code that has been provided to the user is stored. For example, in the access code information 31, the user ID of the user who has received the access code and the date and time at which the access code has been provided are stored in association with the provided access code. Furthermore, in the access code information 31, information indicating the user information to be provided is stored in association with the access code. FIG. 4 is a diagram illustrating an example of a data structure of the access code information according to the first embodiment. In the access code information 31 illustrated in FIG. 4, a user ID, a provision date and time, and information indicating a type of the user information to be provided are stored for each access code. For example, in the example in FIG. 4, an access code "XXXXXA" is provided to a user with a user ID "0001" on "2012/XX/XX at 12:00:00", and the user information to be provided by the access code is "age". For another example, the access code "XXXXXB" is provided to a user with a user ID "0002" on "2012/XX/XX at 12:05:05", and the user information to be provided by the access code is "credit card number".

The security policy information 32 is data in which a security policy on whether to provide the user information upon reception of the access code is stored. In the first embodiment, a validity period of the access code is stored as the security policy information 32. For example, if "10 minutes" is set in the security policy information 32, the access code is considered as valid within 10 minutes of the provision date and time of the access code.

The control unit 22 is a device that controls the user information management apparatus 13. For example, the control unit 22 may be an electronic circuit, such as a central processing unit (CPU) or a micro processing unit (MPU), or an integrated circuit, such as an application specific integrated circuit (ASIC) or a field programmable gate array (FPGA).

The control unit 22 includes an internal memory for storing control data and programs that define various processing procedures, and performs various types of processing based on the data and the programs. The control unit 22 functions as various processing units when various programs are executed. For example, the control unit 22 includes an authenticating unit 40, an accepting unit 41, a generating unit 42, a providing unit 43, a registering unit 44, a verifying unit 45, and a transmitting unit 46.

The authenticating unit 40 authenticates a user when access is requested by the user terminal 11. For example, when access is requested by the user terminal 11, the authenticating unit 40 transmits a web page of a login screen containing input fields of a user ID and a password to the user terminal 11, so that the login screen is displayed on the user terminal 11. If login is requested via the login screen, the authenticating unit 40 authenticates the user by checking whether the user ID and the password input in the input fields of the login screen match the user ID and the password of any of the users stored in the user information table 30. If the input user ID and the password do not match the user ID and the password of any of the users stored in the user information table 30, the authenticating unit 40 notifies the user terminal 11 of an authentication failure.

The accepting unit 41 accepts designation of user information to be provided to the in-store device 12 from the user authenticated by the authenticating unit 40. For example, the accepting unit 41 transmits, to the user terminal 11, a web page of a selection screen for selecting user information to be provided, so that the selection screen is displayed on the user terminal 11. The selection screen displays, for example, items indicating the types of the user information, such as the name and the address, stored in the user information table 30, and enables to individually select each of the items to select the user information to be provided. If the completion of the selection is designated via the selection screen, the accepting unit 41 specifies the user information of the item in the selected state on the selection screen as the designated user information to be provided to the in-store device 12.

The generating unit 42 generates an access code to be provided to the user. For example, when the completion of the selection is designated via the selection screen, the generating unit 42 generates a new access code according to a predetermined code generation rule so that the access code does not become the same as any access code generated in the past. The access code may be a numerical code, a character code, or a code in which numerals and characters are combined.

The providing unit 43 provides the access code generated by the generating unit 42 to the user. For example, the providing unit 43 transmits access code data to the user terminal 11 of the user in order to provide the access code to the user. The way of providing the access code is not limited to transmitting the access code data. For example, the providing unit 43 may encode the access code into a two-dimensional code or the like, and may transmit image data of an image of the encoded two-dimensional code to the user terminal 11. Alternatively, the providing unit 43 may display numerals or characters of the access code on the user terminal 11 to provide the access code to the user.

The registering unit 44 registers, in the access code information 31, the user ID of the user authenticated by the authenticating unit 40 and the user information that is specified by the accepting unit 41 so as to be provided to the in-store device 12, in association with the access code that is generated by the generating unit 42 and provided by the providing unit 43. Therefore, the access code provided by the providing unit 43 is stored in the access code information 31.

When receiving the access code from the in-store device 12, the verifying unit 45 verifies whether the received access code is a proper code. For example, the verifying unit 45 determines whether the received access code is stored in the access code information 31. If the access code is stored in the access code information 31, the verifying unit 45 verifies whether the received access code satisfies the security policy stored in the security policy information 32. For example, the verifying unit 45 determines whether the validity period of the received access code has not expired after the date and time at which the access code was provided to the user. If the received access code is not registered in the access code information 31 and if the received access code does not satisfy the security policy, the verifying unit 45 notifies the in-store device 12 that the access code is not a proper code.

When it is determined that the access code is a proper code through the verification by the verifying unit 45, the transmitting unit 46 specifies the user ID and the to-be-provided user information stored in the access code information 31 in association with the access code. The transmitting unit 46 reads data of the specified user information on the specified user ID from the user information table 30, and transmits the read data of the user information to the in-store device 12.

A configuration of the user terminal 11 will be explained below. FIG. 5 is a diagram illustrating a functional configuration example of the user terminal according to the first embodiment.

As illustrated in FIG. 5, the user terminal 11 includes an operation input unit 50, a display unit 51, a communication I/F unit 52, a storage unit 53, and a control unit 54.

The operation input unit 50 is an input device for inputting various types of information. For example, the operation input unit 50 may be a mouse or a keyboard. The operation input unit 50 receives input of various operations from the user and inputs operating information indicating the contents of the received operations to the control unit 54.

The display unit 51 is a display device for displaying various types of information. For example, the display unit 51 may be a liquid crystal display (LCD) or a cathode ray tube (CRT). The display unit 51 displays various types of information. For example, the display unit 51 displays the login screen and the selection screen.

The communication I/F unit 52 is an interface, such as a NIC. The communication I/F unit 52 transmits and receives various types of data to and from other devices via the network. For example, the communication I/F unit 52 receives data of various screens, such as the login screen and the selection screen, from the user information management apparatus 13, and transmits various types of operating information on the screens to the user information management apparatus 13. The communication I/F unit 52 also receives the access code from the user information management apparatus 13.

The storage unit 53 is a device for storing various types of information. For example, the storage unit 53 may be a semiconductor memory device, such as a RAM or a flash memory, or a storage device, such as a hard disk or an optical disk.

The storage unit 53 stores therein an OS executed by the control unit 54 and various programs used to manage the user information. The storage unit 53 also stores therein various types of data. For example, the storage unit 53 stores therein an access code 60.

The control unit 54 is a device that controls the user terminal 11. For example, the control unit 54 may be an electronic circuit, such as a CPU or an MPU, or an integrated circuit, such as an ASIC or an FPGA. The control unit 54 includes an internal memory for storing control data and programs that define various processing procedures, and performs various types of processing based on the data and the programs. The control unit 54 functions as various processing units when various programs are executed. For example, the control unit 54 includes an access control unit 70, a storing unit 71, and a presenting unit 72.

When predetermined operation to request acquisition of an access code is performed on the operation input unit 50, the access control unit 70 issues an access request to the user information management apparatus 13. Accordingly, the user information management apparatus 13 transmits data of the login screen, and the login screen of the user information management apparatus 13 is displayed on the display unit 51. The user enters a user ID and a password in the login screen to perform login, and selects user information to be provided by the access code from the selection screen that is displayed after login.

When receiving the access code from the user information management apparatus 13, the storing unit 71 stores the access code in the storage unit 53. Therefore, the access code 60 is stored in the storage unit 53.

When predetermined operation to request presentation of the access code is performed on the operation input unit 50, the presenting unit 72 presents the access code 60 stored in the storage unit 53. For example, the presenting unit 72 enables the access code 60 stored in the storage unit 53 to be read by wireless near field communication, such as near field communication (NFC) or radio frequency identification (RFID). The way of presenting the access code 60 is not limited to enabling the access code 60 to be read by radio. For example, if the access code 60 is image data of a two-dimensional code or the like, the presenting unit 72 may display an image of the image data on the display unit 51. Furthermore, the presenting unit 72 may convert the access code 60 to image data of a two-dimensional code or the like, and may display an image of the converted access code on the display unit 51. Moreover, the presenting unit 72 may display numerals or characters of the access code 60 on the display unit 51.

Figure 6:
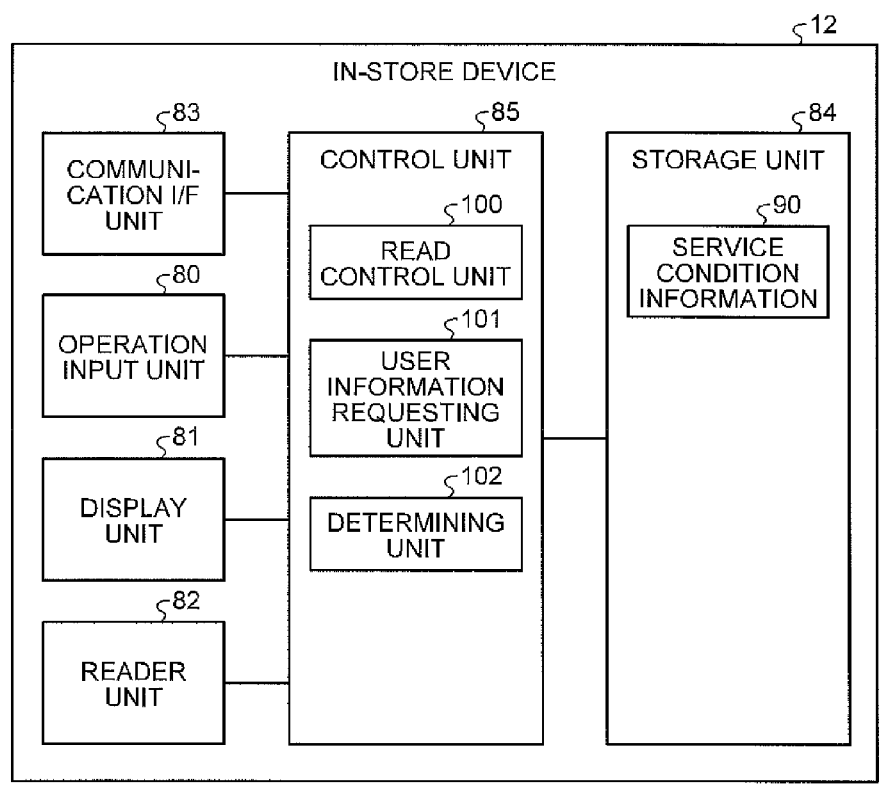
FIG. 6 is a diagram illustrating a functional configuration example of an in-store device according to the first embodiment.

A configuration of the in-store device 12 will be explained below. FIG. 6 is a diagram illustrating a functional configuration example of the in-store device according to the first embodiment.

As illustrated in FIG. 6, the in-store device 12 includes an operation input unit 80, a display unit 81, a reader unit 82, a communication I/F unit 83, a storage unit 84, and a control unit 85.

The operation input unit 80 is an input device for inputting various types of information. For example, the operation input unit 80 may be a mouse, a keyboard, or a touch panel. The operation input unit 80 receives input of various types of information from a store staff and inputs operating information indicating the contents of the received operations to the control unit 85.

The display unit 81 is a display device for displaying various types of information. For example, the display unit 81 may be an LCD or a CRT. The display unit 81 displays various types of information. For example, the display unit 81 displays whether the user satisfies a service providing condition.

The reader unit 82 reads the access code and outputs the read access code to the control unit 85. The reader unit 82 may read the access code by wireless near field communication. Alternatively, the reader unit 82 may read an image of a two-dimensional code in which the access code is encoded, and may decode the read image to output the encoded access code to the control unit 85.

The communication I/F unit 83 is an interface, such as a NIC. The communication I/F unit 83 transmits and receives various types of data to and from other devices via the network. For example, the communication I/F unit 83 transmits the access code to the user information management apparatus 13 and receives the user information from the user information management apparatus 13.

The storage unit 84 is a device for storing various types of information. For example, the storage unit 84 may be a semiconductor memory device, such as a RAM or a flash memory, or a storage device, such as a hard disk or an optical disk.

The storage unit 84 stores therein an OS executed by the control unit 85 and various programs used to manage the user information. The storage unit 84 also stores therein various types of data. For example, the storage unit 84 stores therein service condition information 90.

The service condition information 90 is data in which a condition is stored that needs to be satisfied by a user when the user uses a service provided by a store having the in-store device 12. For example, if a store sells alcohol or tobacco, a condition that a user who buys alcohol or tobacco should be 20 years of age or older is stored as the service condition information 90.

The control unit 85 is a device that controls the in-store device 12. For example, the control unit 85 may be an electronic circuit, such as a CPU or an MPU, or an integrated circuit, such as an ASIC or an FPGA. The control unit 85 includes an internal memory for storing control data and programs that define various processing procedures, and performs various types of processing based on the data and the programs. The control unit 85 functions as various processing units when various programs are executed. For example, the control unit 85 includes a read control unit 100, a user information requesting unit 101, and a determining unit 102.

When predetermined operation to request start of reading the access code is performed on the operation input unit 80, the read control unit 100 reads the access code by controlling the reader unit 82. Incidentally, when operation is performed to provide a service for which it is necessary to verify whether a user is eligible to receive the service, the read control unit 100 may start reading the access code in conjunction with the operation. For example, if the in-store device 12 is a POS terminal and a product code of alcohol or tobacco is scanned, the read control unit 100 may display a message for requesting presentation of the access code and start reading the access code, in conjunction with the scan operation.

The user information requesting unit 101 transmits the access code that the reader unit 82 has read under the control of the read control unit 100 to the user information management apparatus 13 to thereby request the user information management apparatus 13 to provide the user information.

When receiving the user information from the user information management apparatus 13, the determining unit 102 determines whether the received user information satisfies the condition stored in the service condition information 90. The determining unit 102 displays whether the user satisfies the service providing condition on the display unit 81 based on a determination result. For example, when receiving the age of the user as the user information from the user information management apparatus 13 for the sale of alcohol or tobacco, the determining unit 102 determines whether the user is 20 years of age or older, and if the user is under 20 years of age, displays a message that the sales condition is not satisfied. Meanwhile, the determining unit 102 may control processes so as not to provide the service if the received user information does not satisfy the condition stored in the service condition information 90. For example, if the user is under 20 years of age for the sale of alcohol or tobacco, the determining unit 102 may prevent the transaction process from being completed until alcohol or tobacco is removed. Furthermore, when the user information is information on a credit card and if a credit card number and an expiry date are displayed so as to be viewed by a store staff, the information may be misused. Therefore, a part of the information may be displayed as turned letters.

1-3. Flow for Providing User Information

The flow for providing the user information on the user by the system 10 according to the first embodiment will be explained below with reference to FIG. 7 and FIG. 8. FIG. 7 is a sequence diagram illustrating the flow for providing the access code to the user.
(1) When the user performs predetermined operation on the operation input unit 50 to request acquisition of an access code, the user terminal 11 issues an access request to the user information management apparatus 13.

(2) The user information management apparatus 13 receives the access request from the user terminal 11.
(3) When receiving the access request, the user information management apparatus 13 transmits a web page of the login screen to the user terminal 11, so that the login screen is displayed on the user terminal 11. Accordingly, the user enters a user ID and a password in the login screen by operating the operation input unit 50 and performs operation to request login.
(4) When the operation to request the login is performed on the login screen, the user terminal 11 transmits the user ID and the password entered in the login screen to the user information management apparatus 13.
(5) The user information management apparatus 13 authenticates the user by the user ID and the password received from the user terminal 11.
(6) When the user is authenticated by the user ID and the password, the user information management apparatus 13 transmits a notice that the authentication has successfully completed, and also transmits a web page of the selection screen to the user terminal 11, so that the selection screen is displayed on the user terminal 11. The user designates user information to be provided to the in-store device 12 from the selection screen by operating the operation input unit 50, and performs operation to designate the completion of the selection.
(7) When the operation to designate the completion of the selection is performed on the selection screen, the user terminal 11 notifies the user information management apparatus 13 of the user information that is in the selected state on the selection screen, and requests an access code.
(8) The user information management apparatus 13 generates the access code.
(9) The user information management apparatus 13 registers the user ID of the authenticated user and the selected user information in the access code information 31 in association with the generated access code.
(10) The user information management apparatus 13 provides the generated access code to the user. For example, the user information management apparatus 13 transmits the generated access code to the user terminal 11. The user terminal 11 stores the received access code.

FIG. 8 is a sequence diagram illustrating the flow for providing the user information on the user to the in-store device by using the access code.
(11) The user requests the store to provide a service. For example, the user requests the store to sell alcohol or tobacco.
(12) If it is necessary to verify whether the user is eligible to receive the service, a store staff requests the user to present an access code.
(13) The user performs predetermined operation on the operation input unit 50 to request presentation of the access code and presents the access code by using the user terminal 11.
(14) The in-store device 12 reads the presented access code by using the reader unit 82, and transmits the read access code to the user information management apparatus 13.
(15) When receiving the access code, the user information management apparatus 13 verifies whether the received access code is a proper code.
(16) When determining that the access code is a proper code through the verification, the user information management apparatus 13 specifies the user ID and the user information to be provided, which are stored in the access code information 31 in association with the access code, and reads data of the specified user information on the specified user ID from the user information table 30.

(17) The user information management apparatus 13 transmits the read data of the user information to the in-store device 12.

(18) When receiving the user information from the user information management apparatus 13, the in-store device 12 determines whether the received user information satisfies the condition stored in the service condition information 90.

(19) The in-store device 12 displays whether the user satisfies the service providing condition on the display unit 81 based on a determination result.

(20) When the service is permitted to be provided, the store staff provides the service to the user. The user information provided by the user information management apparatus 13 is not limited to the personal information on the user, and any information on the user may be used. For example, the user information management apparatus 13 may store, as the user information, a user authentication result on the login screen in the user information table 30 and may transmit the user information with data of the stored authentication result to the in-store device 12, and, the in-store device 12 may provide a service to the user when the user information management apparatus 13 has successfully authenticated the user.

Furthermore, the user information management apparatus 13 may store, as the user information on the user, characteristic information indicating the characteristics of the user, and may also transmit the characteristic information to the in-store device 12. The characteristic information may be any information that enables to identify the user. For example, image data of a face of the user or physical characteristic information, such as a height, sex, a fingerprint, a voiceprint, or a position of a mole, may be used. For example, the user information management apparatus 13 stores the image data of the face of the user in the storage unit 21 in association with the user ID of the user. The transmitting unit 46 specifies the user ID associated with the access code from the access code information 31, and transmits the image data associated with the specified user ID, as the user information, to the in-store device 12. The in-store device 12 displays an image of the transmitted image data. Therefore, a store staff can identify the user by comparing the face in the image with the actual face of the user who has requested the service. The method to identify the user is not limited to the method performed by a person, such as a store staff. For example, it may be possible to mount a camera on the in-store device 12 to capture the face of the user, and perform matching or the like by comparing the captured face with a face of the received image data to identify the user. Furthermore, if the characteristic information is a voiceprint, it may be possible to record voice of the user by a microphone and determine whether the voiceprints match with each other to identify the user. Moreover, if the characteristic information is a fingerprint, it may be possible to acquire the fingerprint of the user by a fingerprint reader and determine whether the fingerprints match with each other to identify the user. Namely, the in-store device 12 may acquire the physical characteristics of the user to identify the user.

As described above, by selecting the user information to be provided and by transmitting, to the in-store device 12, the user information corresponding to a service provided by a store having the in-store device 12, it becomes possible to prevent leakage of unnecessary information. Furthermore, it becomes possible to provide the user information by the access code, so that the user need not carry a driver's license or a credit card on which the personal information on the user is written and can reduce the possibility of losing the driver's license or the credit card. Furthermore, because the user information management apparatus 13 provides the user information on each of the users, the user information management apparatus 13 can be used as a substitute for an identification certificate of the user. Moreover, because the user information management apparatus 13 manages the user information on each of the users and provides the user information to the in-store device 12, the in-store device 12 need not manage the information on the users. Furthermore, because the in-store device 12 can acquire necessary user information by transmitting the access code to the user information management apparatus 13, it becomes possible to reduce load of the system construction in the store. Therefore, it is possible to securely authenticate the users at low costs.

Furthermore, in the conventional technology, because the user terminal 11 and the in-store device 12 are offline, even when user identification is performed when a user has visited a store, it is difficult for the store to associate the user with the user information managed by the user information management apparatus 13. In contrast, according to the first embodiment, it is possible to associate the user who has visited the store with the user information on the user managed by the user information management apparatus 13 by using the access code. Moreover, in the conventional technology, it is difficult to reflect a result of the user authentication performed by the user information management apparatus 13 over the network into the store in the real world because the user terminal 11 and the in-store device 12 are offline. In contrast, according to the first embodiment, it is possible to reflect the result of the user authentication performed over the network into the device in the store by using the access code. Furthermore, in the conventional technology, it is difficult to use the user information managed by the user information management apparatus 13 over the network to support user's purchase or activities in the real world because the user terminal 11 and the in-store device 12 are offline. In contrast, according to the first embodiment, it is possible to associate the user information managed over the network with the user in the real world by using the access code, so that the user information may be used to support user's purchase or activities.

1-4. Operation

Operation of the system 10 according to the first embodiment will be explained below. First, explanation will be given of the flow of an access code providing process for providing an access code to the user by the user information management apparatus 13 of the first embodiment. FIG. 9 is a flowchart illustrating the flow of the access code providing process. The access code providing process is performed at a predetermined timing, for example, a timing at which the operation to designate the completion of the selection is performed on the selection screen and the user information that is in the selected state on the selection screen is notified by the user terminal 11.

As illustrated in FIG. 9, the generating unit 42 generates a new access code (S10). The registering unit 44 registers the user ID of the user authenticated by the authenticating unit 40 and the user information selected on the selection screen in the access code information 31 in association with the generated access code (S11). The providing unit 43 provides the generated access code to the user (S12), and the process ends.

Next, explanation will be given of the flow of a user information providing process for providing the user information to the in-store device 12 by the user information management apparatus 13 of the first embodiment. FIG. 10 is a flowchart illustrating the flow of the user information providing process. The user information providing process is performed at a predetermined timing, for example, a timing at which the access code is received.

As illustrated in FIG. 10, the verifying unit 45 determines whether the received access code is stored in the access code information 31 (S20). If the access code is stored in the access code information 31 (YES at S20), the verifying unit 45 determines whether the received access code satisfies the security policy stored in the security policy information 32 (S21). If the access code satisfies the security policy (YES at S21), the transmitting unit 46 specifies the user ID and the user information to be provided, which are stored in the access code information 31 in association with the received access code (S22). The transmitting unit 46 reads data of the specified user information on the specified user ID from the user information table 30 and transmits the read data of the user information to the in-store device 12 (S23), and the process ends.

In contrast, if the received access code is not registered in the access code information 31 (NO at S20), and if the received access code does not satisfy the security policy (NO at S21), the transmitting unit 46 notifies the in-store device 12 that the access code is not a proper code (S24), and the process ends.

1-5. Advantageous Effects

As described above, the user information management apparatus 13 stores various types of user information on the user in the storage unit 21. Furthermore, the user information management apparatus 13 provides the access code used to access the user information stored in the storage unit 21 to the user. When receiving the access code from the in-store device 12 installed in the store that provides the service, the user information management apparatus 13 transmits, to the in-store device 12, user information corresponding to the service provided by the store having the in-store device 12 from among the various types of user information stored in the storage unit 21. Therefore, the user information management apparatus 13 can prevent leakage of unnecessary information.

Furthermore, the user information management apparatus 13 presents the selection screen to receive designation of the user information to be provided to the in-store device 12, and provides an access code used to access the designated user information to the user. When receiving the access code from the in-store device 12, the user information management apparatus 13 transmits, to the in-store device 12, the user information designated on the selection screen among the various types of user information stored in the storage unit 21. Therefore, the user information management apparatus 13 enables the user to designate the user information to be provided, so that unnecessary user information is not transmitted to the in-store device 12 and leakage of unnecessary information can be prevented.

Moreover, the validity period of the access code is determined, and if the access code received from the in-store device 12 has not expired, the user information management apparatus 13 transmits, to the in-store device 12, the user information corresponding to the service provided by the in-store device 12. Therefore, by appropriately determining the validity period, the user information management apparatus 13 can prevent unauthorized use of the access code even when the access code is leaked, so that leakage of unnecessary information can be prevented.

Second Embodiment

A second embodiment will be explained below. The configurations of the system 10, the user terminal 11, and the in-store device 12 according to the second embodiment are the same as the configurations of the system 10, the user terminal 11, and the in-store device 12 according to the first embodiment illustrated in FIG. 1, FIG. 5, and FIG. 6; therefore, explanation thereof will be omitted.

2-1. Configuration of User Information Management Apparatus

Figures 11, 12:
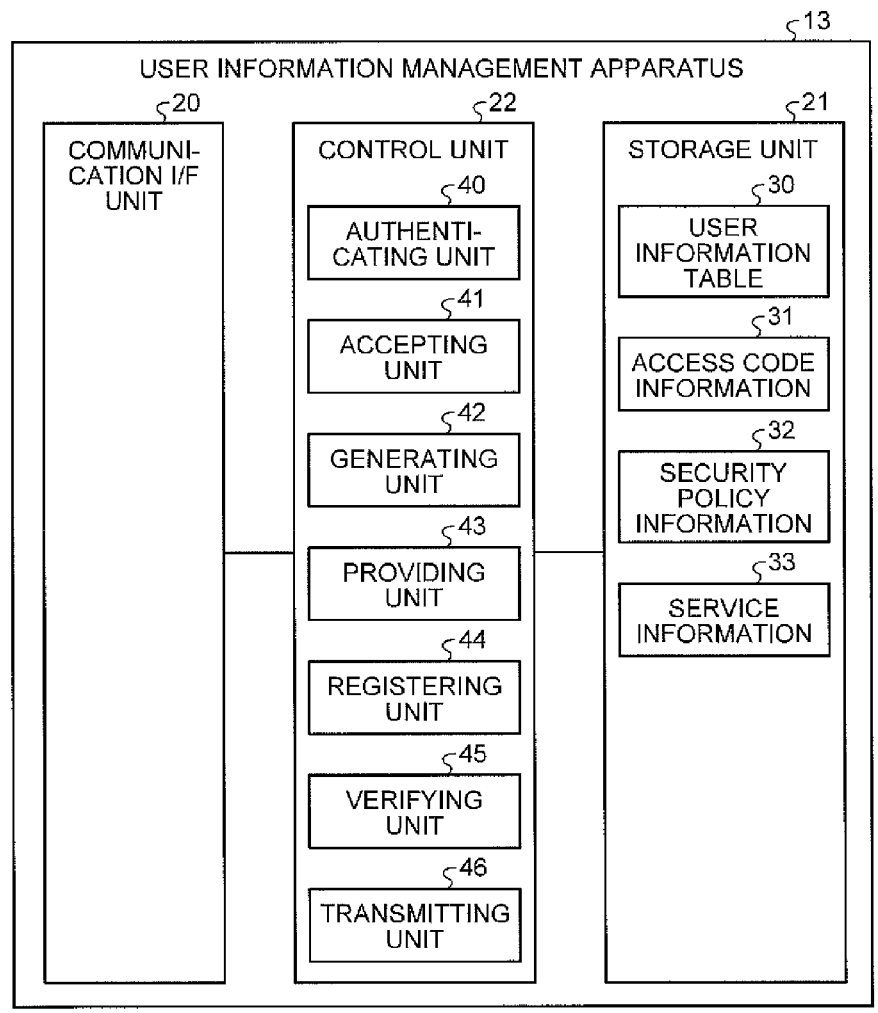
FIG. 11 is a diagram illustrating a functional configuration example of a user information management apparatus according to a second embodiment.
FIG. 12 is a diagram illustrating an example of a data structure of service information.

FIG. 11 is a diagram illustrating a functional configuration example of a user information management apparatus according to a second embodiment. The configuration of the user information management apparatus 13 according to the second embodiment is approximately the same as the configuration of the user information management apparatus 13 according to the first embodiment illustrated in FIG. 2; therefore, different components will be mainly explained below.

As illustrated in FIG. 11, the storage unit 21 of the user information management apparatus 13 further stores therein service information 33.

The service information 33 is data in which user information needed for a service is stored for each of services. For example, the service information 33 is data in which user information needed for a service is stored for each of the services that are provided by a store and that need the user information. FIG. 12 is a diagram illustrating an example of a data structure of the service information. For example, a person is not allowed to buy alcohol or tobacco if he/she is under 20 years of age. Therefore, in the service information 33 illustrated in FIG. 12, age is stored as the user information needed for purchase of tobacco, and age is also stored as the user information needed for purchase of alcohol. Furthermore, if a credit card is used for payment, a credit card number is needed. Therefore, in the service information 33 illustrated in FIG. 12, a credit card number is stored as the user information needed for payment by a credit card.

Figure 13:
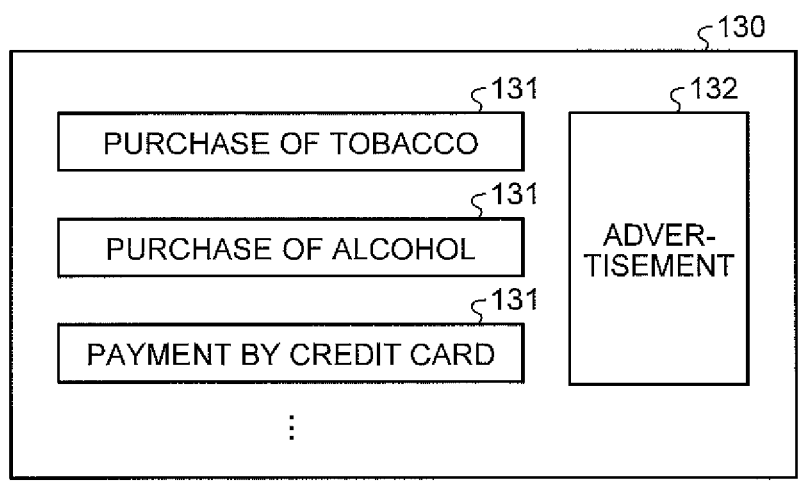
FIG. 13 is a diagram illustrating an example of a selection image.

The accepting unit 41 transmits, to the user terminal 11, a web page of a selection screen for selectively presenting services provided by the store, instead of the user information provided to the store, to thereby display the selection screen on the user terminal 11, and receives designation of a service via the selection screen. FIG. 13 is a diagram illustrating an example of a selection image. A selection image 130 displays names of services on buttons 131 arranged on the screen, and enables to select a service by the buttons 131.

Furthermore, an advertisement 132 may be displayed on the selection image 130 according to the second embodiment. When a service is designated via the selection screen, the accepting unit 41 displays the advertisement 132 associated with the designated service on the selection image 130 for presentation to the user. For example, the accepting unit 41 displays, as the advertisement, a neighborhood store that provides the designated service on the selection image 130. Furthermore, if the designated service is related to goods, the accepting unit 41 displays, as the advertisement, an advertisement associated with the goods or related goods used with the goods on the selection image 130. For example, if the designated service is a purchase of tobacco, the accepting unit 41 displays, as the advertisement, an advertisement for tobacco or an advertisement for a lighter or an ashtray to be used with tobacco on the selection image 130. The advertisement associated with each of the services may be acquired by sending a query to other server device that stores therein advertisements to be provided for the respective services. Alternatively, the user information management apparatus 13 may store, as advertisement information, the advertisements associated with the respective services in the storage unit 21, and acquire an advertisement to be displayed based on the advertisement information. The layout of the selection image 130 illustrated in FIG. 13 is one example, and the present invention is not limited thereto.

The registering unit 44 registers, in the access code information 31, the user ID of the user authenticated by the authenticating unit 40 and the service that is presented by the accepting unit 41 and that is designated via the selection image 130, in association with the access code. The registering unit 44 may store, in the access code information 31, the user information that is needed to provide the designated service and that is stored in the service information 33, instead of storing the service. For example, the registering unit 44 reads the user information needed for the designated service from the service information 33, and stores the read user information in the access code information 31 in association with the access code.

When receiving the access code from the in-store device 12, the verifying unit 45 verifies whether the received access code is a proper code.

When it is determined that the access code is a proper code through the verification by the verifying unit 45, the transmitting unit 46 specifies the user ID and the service that are stored in the access code information 31 in association with the access code. The transmitting unit 46 reads the user information needed for the specified service from the service information 33, and specifies the read user information as the user information to be provided. Subsequently, the transmitting unit 46 reads data of the specified user information on the specified user ID from the user information table 30, and transmits the read data of the user information to the in-store device 12. Incidentally, if the registering unit 44 has registered the user information in the access code information 31 instead of the service as described above, the transmitting unit 46 specifies the user ID and the user information that are stored in the access code information 31 in association with the access code, reads data of the specified user information on the specified user ID from the user information table 30, and transmits the read data of the user information to the in-store device 12.

2-2. Advantageous Effects

As described above, the user information management apparatus 13 further stores, in the storage unit 21, the service information 33 in which the user information needed for a service is stored for each of the services that are provided by the store and that need the user information. The user information management apparatus 13 presents the services that need the user information and receives designation of a service. The user information management apparatus 13 registers, in the access code information 31, the designated service or the user information that is stored in the service information 33 as the user information needed to provide the service, in association with the access code to be provided. When receiving the access code from the in-store device 12, the user information management apparatus 13 obtains a service that is stored in the access code information 31 in association with the received access code, and transmits, to the in-store device 12, the user information that is stored in the service information 33 as the user information needed to provide the service or the user information that is stored in the access code information 31 in association with the received access code. Therefore, even if a user does not know the user information needed to receive a service, the user information management apparatus 13 allows the user to designate a subject service and provides the access code that is used to provide only the user information needed for the subject service to the user. Moreover, when the user provides the access code provided by the user information management apparatus 13 to the in-store device 12 installed in a store that provides a service desired by the user, the user information management apparatus 13 can transmit only necessary user information to the in-store device 12 and therefore can prevent leakage of unnecessary information.

Furthermore, the user information management apparatus 13 further presents an advertisement related to the designated service to the user. Therefore, the user information management apparatus 13 can provide the advertisement to the user in accordance with the service to be used, so that the advertisement effectiveness can be improved.

Third Embodiment

A third embodiment will be explained below. The configurations of the system 10, the user terminal 11, and the in-store device 12 according to the third embodiment are the same as the configurations of the system 10, the user terminal 11, and the in-store device 12 according to the first embodiment illustrated in FIG. 1, FIG. 5, and FIG. 6; therefore, explanation thereof will be omitted.

3-1. Configuration of User Information Management Apparatus

FIG. 14 is a diagram illustrating a functional configuration example of a user information management apparatus according to the third embodiment. The configuration of the user information management apparatus 13 according to the third embodiment is approximately the same as the configuration of the user information management apparatus 13 according to the first embodiment illustrated in FIG. 2; therefore, different components will be mainly explained below.

As illustrated in FIG. 14, the storage unit 21 of the user information management apparatus 13 further stores therein in-store device information 35.

The in-store device information 35 is data in which user information needed for a service provided by a store having the in-store device 12 is stored for each of the in-store devices 12. FIG. 15 is a diagram illustrating an example of a data structure of the in-store device information. For example, a store A where an in-store device 12A is installed sells alcohol or tobacco. In this case, the user information needed for the in-store device 12A is age. Therefore, in the in-store device information 35 illustrated in FIG. 15, the age is stored as the user information needed for the in-store device 12A. Furthermore, a store B where an in-store device 12B is installed accepts payment by a credit card. In this case, the user information needed for the in-store device 12B is a credit card number. Therefore, in the in-store device information 35 illustrated in FIG. 15, a credit card number is stored as the user information needed for the in-store device 12B.

The accepting unit 41 according to the third embodiment transmits a web page of a selection screen for selecting whether to issue an access code to the user terminal 11 to display the selection screen on the user terminal 11, and receives a designation to issue the access code via the selection screen.

When the designation to issue the access code is given via the selection screen, the generating unit 42 generates a new access code. In the third embodiment, the access code is generated when the designation to issue the access code is given via the selection screen. However, it may be possible not to display the selection screen and may generate the access code when the user authentication has successfully completed.

The registering unit 44 according to the third embodiment registers the user ID of the user authenticated by the authenticating unit 40 in the access code information 31 in association with the access code generated by the generating unit 42. Namely, in the third embodiment, the user information is not registered in the access code information 31.

When receiving the access code from the in-store device 12, the verifying unit 45 verifies whether the received access code is a proper code.

When it is determined that the access code is a proper code through the verification by the verifying unit 45, the transmitting unit 46 transmits the user information needed for a service provided by a store having the in-store device 12 that has transmitted the access code, based on the in-store device information 35. For example, the transmitting unit 46 reads the user information that is stored in the in-store device information 35 in association with the in-store device 12 that has transmitted the access code, and specifies the read user information as the necessary user information. Then, the transmitting unit 46 reads data of the specified user information on the specified user ID from the user information table 30, and transmits the read data of the user information to the in-store device 12 that has transmitted the access code.

3-2. Advantageous Effects

As described above, the user information management apparatus 13 further stores, in the storage unit 21, the in-store device information 35 in which the user information needed for a service provided by a store having the in-store-device 12 is stored for each of the in-store devices 12. When receiving the access code from the in-store device 12, the user information management apparatus 13 transmits, to the in-store device 12, the user information needed for the service provided by the store having the in-store device 12 that has transmitted the access code, based on the in-store device information 35. Therefore, the user information management apparatus 13 can transmit only the user information needed for the service provided by the store having the in-store device 12 to each of the in-store devices 12 and therefore can prevent leakage of unnecessary information.

4. Others

While the embodiments of the present invention have been explained in detail above with reference to the accompanying drawings, the embodiments are described by way of example only. Various modifications and changes of the invention including the aspects described in the Detailed Description of the Embodiments can be made based on the knowledge of one skilled in the art.

For example, while an example is explained in the above embodiments that a store serves as a facility that provides a service and an in-store device serves as a facility device, the present invention is not limited to this example. For example, the present invention may be applied when identification is performed in public institutions, such as administrative institution or Legal Affairs Bureau.

Furthermore, while an example is explained in the above embodiments that the user information management apparatus 13 stores therein the user information to be provided upon reception of the access code, the present invention is not limited to this example. For example, the in-store device 12 may send a request for necessary user information to the user information management apparatus 13 together with the access code, and when the user information management apparatus 13 determines that the access code is a proper code, the user information management apparatus 13 may transmit the requested user information to the in-store device 12. The user information management apparatus 13 transmits only the user information requested by the in-store device 12 to the in-store device 12, so that leakage of unnecessary information can be prevented.

Moreover, while an example is explained in the above embodiments that a period during which the access code is considered as valid is stored in the security policy information 32 to set the validity period of the access code as the security policy, the present invention is not limited to this example. For example, it may be possible to set, as the security policy, a limitation on the number of times that the user information can be provided by an access code. In this case, for example, the upper limit number of times that the user information can be provided is stored in the security policy information 32. Furthermore, the access code information 31 is provided with a memory area for storing the number of times that the user information has been provided by the access code. The transmitting unit 46 counts up the number of provisions corresponding to the access code every time the user information is provided by the access code, and if the number of provisions reaches the upper limit, the transmitting unit 46 invalidates the access code and notifies the in-store device 12 that the access code is not a proper code. Moreover, for example, it may be possible to limit the number of times that the user information can be provided by the access code to one by using the access code like a one-time password. In this case, for example, when provision of the user information by the access code is completed, the transmitting unit 46 may delete the record of the access code from the access code information 31. In this way, by limiting the number of times that the user information can be provided by the access code, it becomes possible to prevent leakage of the user information even when the access code is leaked, so that it becomes possible to enhance the security of the access code. Furthermore, it may be possible to store, as the security policy information 32, an IP address for which access is authorized or an IP address for which access is not authorized so as to permit only access from the authorized IP address and block access from the unauthorized IP address. For example, it may be possible to store the IP address of the in-store device 12 as the security policy information 32 and block access by devices other than the in-store device 12. With this configuration, it is possible to enhance the security.

Furthermore, while an example is explained in the above embodiments that the age is used as the user information needed to sell alcohol or tobacco, the present invention is not limited to this example. For example, to sell alcohol or tobacco, it is only necessary to verify whether the user is 20 years of age or older. Therefore, the user information management apparatus 13 may transmit, as the user information on the user, information on whether the user is 20 years of age or more.

Moreover, while an example is explained in the above embodiments that the user ID of the user, the provision date and time, and the user information to be provided are stored in the access code information 31 in association with the provided access code, the present invention is not limited to this example. For example, the user ID of the user, the provision date and time, and the user information to be provided may be encoded and the encoded data may be contained in the access code. In this case, the user information management apparatus 13 may decode the encoded data contained in the received access code and obtains the user ID of the user, the provision date and time, and the user information to be provided. With this configuration, the user information management apparatus 13 need not store the user ID of the user, the provision date and time, and the user information to be provided in association with the generated access code, so that the storage area can be reduced. Furthermore, if a plurality of the user information management apparatuses 13 are present, each of the user information management apparatuses 13 can recognize the user ID, the provision date and time, and the user information to be provided, by the access code.

The user information management apparatus 13 as described above may be implemented by a plurality of server computers. Furthermore, the structure of the user information management apparatus 13 may be changed flexibly depending on the functions. For example, the functions may be implemented by calling an external platform by an application programming interface (API) or a network computing.

Moreover, "a unit" recited in the claims may be replaced with "a section, a module, or a means" or "a circuit". For example, the searching unit may be replaced with a searching means or a search circuit.

According to an embodiment of the present invention, the user information management apparatus can prevent leakage of unnecessary information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A user information management apparatus comprising:
a storage unit that stores therein user information about a user;
a providing unit that provides, from the user information management apparatus, an access code to a computing device of the user, the access code being used to access the user information stored in the storage unit of the user information management apparatus when the access code is received by the user information management apparatus; and
a transmitting unit that transmits, from the user information management apparatus to a facility device installed in a facility that provides a service to the user, user information corresponding to the service provided by the facility having the facility device among the user information stored in the storage unit in response to the user information management apparatus receiving the access code from the facility device,
wherein the user information management apparatus, the computing device, and the facility device are each devices that are separate from each other.

2. The user information management apparatus according to claim 1, wherein
the storage unit stores therein, as the user information on the user, characteristic information indicting characteristics of the user, and
the transmitting unit transmits the characteristic information stored in the storage unit to the facility device.

3. The user information management apparatus according to claim 1, further comprising an accepting unit that accepts designation of the user information to be provided to the facility device, wherein
the providing unit provides the user with the access code used to access the designated user information accepted by the accepting unit, and
the transmitting unit transmits, when receiving the access code from the facility device, the designated user information accepted by the accepting unit among the user information stored in the storage unit.

4. The user information management apparatus according to claim 3, wherein
the storage unit further stores therein service information, in which user information needed for a service is associated with for each of services that are provided by the facility and that need the user information, and
the accepting unit presents the services that need the user information and accepts designation of a service,
the user information management apparatus further comprising:
a registering unit that registers, as access code information, the designated service that is accepted by the accepting unit or the user information that is stored in the service information as user information needed to provide the service, in the storage unit in association with the access code provided by the providing unit, wherein
when receiving the access code from the facility device, the transmitting unit obtains the service that is stored in the access code information in association with the received access code, and transmits, to the facility device, the user information that is stored in the service information as user information needed to provide the service, or transmits the user information that is stored in the access code information in association with the received access code.

5. The user information management apparatus according to claim 4, wherein the accepting unit further presents an advertisement related to the designated service to the user.

6. The user information management apparatus according to claim 1, wherein
the storage unit further stores therein facility device information, in which user information needed for the service provided by the facility having the facility device is stored for each of facility devices, and
when receiving the access code from a facility device, the transmitting unit transmits, to the facility device that has transmitted the access code, user information needed for the service provided by a facility having the facility device that has transmitted the access code.

7. The user information management apparatus according to claim 1, wherein
the access code has a validity period, and
when the validity period of the access codes has not expired, the transmitting unit transmits the user information corresponding to the service provided by the facility device.

8. The user information management apparatus according to claim 1, wherein the access code is used to access the user information stored in the storage unit of the user information management apparatus when the access code is provided to the user information management apparatus from the facility device from the facility device, which received the access code from the user's computing device.

9. A user information management method which is executed by a computer, comprising:
providing, from an user information management apparatus, a computing device of a user with an access code used to access a user information stored in a storage unit of the user information management that stores therein user information about a user; and
transmitting, from the user information management apparatus to a facility device installed in a facility that provides a service to the user, user information corresponding to the service provided by the facility having the facility device among the user information stored in the storage unit in response to the user information management apparatus receiving the access code from the facility device, wherein the user information management apparatus, the computing device, and the facility device are each devices that are separate from each other.

10. A non-transitory computer-readable recording medium having stored therein a user information management program for causing a computer to execute a process, the process comprising:

providing, from an user information management apparatus, a computing device of a user with an access code used to access a user information stored in a storage unit of the user information management that stores therein user information about a user; and transmitting, from the user information management apparatus to a facility device installed in a facility that provides a service to the user, user information corresponding to the service provided by the facility having the facility device among the user information stored in the storage unit in response to the user information management apparatus receiving the access code from the facility device, wherein the user information management apparatus, the computing device, and the facility device are each devices that are separate from each other.

\* \* \* \* \*